United States Patent [19]

Esaki et al.

[11] Patent Number: 5,131,032
[45] Date of Patent: Jul. 14, 1992

[54] ECHO CANCELLER AND COMMUNICATION APPARATUS EMPLOYING THE SAME

[75] Inventors: Tomohiro Esaki; Yoshihiro Ohta, both of Yokohama, Japan

[73] Assignee: Hitachi, Ltd., Tokyo, Japan

[21] Appl. No.: 492,905

[22] Filed: Mar. 13, 1990

[30] Foreign Application Priority Data

Mar. 13, 1989 [JP] Japan .................... 1-60091

[51] Int. Cl.⁵ .......................... H04M 11/08
[52] U.S. Cl. .................... 379/410; 379/390; 379/406; 379/90
[58] Field of Search ........... 379/90, 110, 387, 388, 379/389, 390, 406, 410

[56] References Cited

U.S. PATENT DOCUMENTS

| | | | |
|---|---|---|---|
| 4,338,492 | 7/1982 | Snopko | 379/110 X |
| 4,356,509 | 10/1982 | Skerlos et al. | 379/110 X |
| 4,414,432 | 11/1983 | Skerlos et al. | 379/110 X |
| 4,456,925 | 6/1984 | Skerlos et al. | 379/387 X |
| 4,629,829 | 12/1986 | Puhl et al. | 379/390 X |

FOREIGN PATENT DOCUMENTS 0146647  6/1988  Japan ........................ 379/110

OTHER PUBLICATIONS

The Bell System Technical Journal, Mar. 1967, vol. XLVI, No. 3, pp. 497–511.

*Primary Examiner*—James L. Dwyer
*Assistant Examiner*—M. Shehata
*Attorney, Agent, or Firm*—Antonelli, Terry, Stout & Kraus

[57] ABSTRACT

An echo canceller and a communication apparatus employing the same, are capable of stably reproducing sounds other than a received sound during a speech through a telephone and the received sound is heard by the other party to the speech. The echo canceller includes first and second input terminals and first and second output terminals. An echo path between the first output terminal and the second input signal terminal is adaptively estimated. A signal component inputted through the echo path is cancelled from a signal inputted to the second input terminal. The canceller further includes a signal mixing means for mixing a plurality of signals inputted thereto.

20 Claims, 8 Drawing Sheets

ECHO CANCELLER AND COMMUNICATION APPARATUS EMPLOYING THE SAME

BACKGROUND OF THE INVENTION a. Field of the Invention

The present invention relates to an echo canceller for cancelling an echo signal (echo) produced in a telephone circuit or a hands-free telephone set and a communication apparatus using it.

b. Background Art

A telephone set which is capable of freeing hands of a user and allows talking by using a microphone and listening through a loudspeaker, instead of using a conventional handset has been recently popularized as a household telephone set. Since a user can talk without holding the handset in his hand, he can be freed from the fatigue of the hand that occurs after talking for a long period of time or freed from the pain at in the ear due to pressing of the handset against the ear. Since the user is free to use his hands, he can advantageously do something else, while talking to the listener through the telephone. Especially, when this type of telephone set is used in a mobile telephone system located in a car, it provides a great advantage in safety during driving.

A telephone circuit is constituted of a two-wire and a four-wire circuit, and a hybrid circuit is used to carry out the conversion between the two-wire and four-wire circuit.

In this hybrid circuit, however, it is difficult to match the impedance completely, so that the inevitable result is a reflection. Generally, when a conversation is carried out by using a microphone and a loudspeaker which has been placed in a telephone set, a signal loop is formed by an acoustic coupling between the microphone and the loudspeaker and the reflection of the signal of the two-wire/four-wire converting circuit. When a gain of this loop exceeds 1 (OdB), a howling phenomenon is generated, in which conversation is virtually impossible.

Under this condition neither, the level of the speaker can be raised nor the sensitivity of the microphone can be enhanced. Therefore, this telephone set cannot be practically employed. It is an object of the invention, to prevent an acoustic howling by the use of an echo suppresser or an echo canceller, or the like.

The reflection of the signal in the two-wire/four-wire converting circuit results in a considerable time delay in a long-distance telephone, so that it normally causes a so-called echo even though it does not produce the howling, which results in an obstruction for conversation.

The echo suppresser which has been used as a countermeasure to prevent the howling employs a so-called voice-operated system. This system compares the magnitude of speech level between two parties, increases the insertion loss of the smaller one to disconnect the signal path of said smaller one, so the gain of the aforesaid loop does not exceed 1.

This system, however, has a disadvantage that a time lag is inevitably generated in the comparison of the speech levels. As a result of this, the control of the amount of the loss is delayed, and the head of a word may be possibly be split. This system has another disadvantage that a blocking phenomenon may be produced, in which the loss amount cannot be controlled when the system is used at a noisy place and noises continuously enter.

On the other hand, an echo canceller using a digital signal processing system has been recently brought to the public's attention as a result of the progress in techniques which employs low-price semiconductors and easy and sure digital signal processing operation. This echo canceller system of the present invention is free from the disadvantages involved in the echo suppresser as mentioned above. In fact, it is contemplated, as a new application, to be used in the field of a telephone conference system. Known examples of the echo canceller include Japanese patent application laid-open KOKAI No. 62-123837.

The principle of the echo canceller system will now be described with reference to FIG. 2.

In this system, only a signal y(t) is outputted from a loudspeaker 2 and reflected from a wall or the like of a room is cancelled among signals s(t)+y(t) inputted to a microphone 5. Accordingly, the aforementioned loop of the signal is not formed, and the howling is prevented. It is not required, in this system, to consider an insertion loss as different from the voice switch. This allows a simultaneous bidirectional conversation and, the head and the end of the word are not split, ensuring good speech quality.

This type of echo canceller is called an acoustic echo canceller because an acoustic coupling path is assured between the microphone and the loudspeaker. Since this echo canceller processes digital signals, an input signal, is converted into digital form by an A/D converter, and an output signal is reproduced to an analog signal by a D/A converter.

First, an explanation is given for the case in which all the input signals to the microphone 5 are echo sounds from the loudspeaker 2. Namely, it is the case when s(t)=0.

A received signal x(t) from a speech device (not shown) is inputted to the received signal input terminal 1 of an echo canceller unit 3, and fed to an X register 8 through an A/D converter 4. The signal is additionally received from a loudspeaker output signal terminal 15 and transmitted to the loudspeaker 2 via an amplifier 17. A sound emitted from the loudspeaker 2 is transmitted to the microphone 5 as a signal of y(t) due to the reflection from the wall of the room or the like and inputted to a microphone input terminal 16 via an amplifier 18. A path through which the signal x(t) becomes the signal y(t) is called an echo path. Further, the microphone input signal y(t) is converted into a digital signal by an A/D converter 6 and inputted to an adder 11.

The received signal x(t), which is converted to digital form by the A/D converter 4, is sequentially stored in n pieces of X registers 8. In the registers 8, every time one sample of the received signal is stored, each of the received signals is sequentially moved to a respective forward adjacent position, and data stored in the last position is abandoned. In such a way, the data of the received signals of n samples (x(t) to x(t−n+1)) is constantly stored in the n pieces of memories.

Tap coefficient registers 9 are provided to be as many as the X registers 8. A tap coefficient (ho(t) to h n−1(t), n: the number of taps), which is an approximation to the impulse response of the assumed echo path, is stored in the tap coefficient register 9.

A convolution computing element 10 carries out a convolution operation based on the data of the tap coefficient register 9 and the X register 8 inputted thereto. The operation can be expressed by:

$$y(t) = \sum_{i=0}^{n-1} hi(t) \times (t - i), t = 0.1 \quad (1)$$

A pseudo echo signal y (t) is obtained by subtraction of a subtracter 11 from the input signal y(t) to the microphone 5 and outputted as a subtracting operation result. Thus, the echo signal is cancelled. This result is an estimated error of the echo path and herein called a residual signal e(t) and expressed as follows:

$$e(t) = \hat{y}(t) - y(t) \quad (2)$$

This residual signal e(t) is inputted to a correction amount calculator 12, converted into an analog signal by a D/A converter 7 and fed to a communication system as a transmitting signal through a transmitting signal output terminal 14.

The echo canceller modifies the aforesaid tap coefficient, according to an algorithm for reducing the residual signal e(t) 0. Examples of this algorithm which is employable, are well known algorithms such as an LMS method (Least Mean Square Method) or a learning identification method. According to these methods, the tap coefficient is corrected or renewed momentarily based on e(t) and x(t), and the obtained result is applied as a new tap coeffiecient. This will be expressed by the following equations, assuming that the amount of correction of the tap coefficient is assumed to be $\Delta hi(t)$.

$$hi(t+1) = hi(t) - \Delta hi(t) \quad (3)$$

$$\Delta hi(t) = G \cdot xi(t) \cdot e(t) \quad (4)$$

Where G indicates a correction coefficient, which is a constant in the LMS method, and a value obtained by the following equation, in the learning identification method.

$$G = g / \left( \sum_{i=o}^{n-1} xi^2(t) \right), \quad (5)$$

g: a constant

These operations are performed by the use of the correction amount calculator 12 and an adder 13. In the correction amount calculator 12, $\Delta hi(t)$ is successively calculated. The calculated result and corresponding data read from the tap coefficient registers 9 are added by the adder 13. The added result is stored again in an appropriate position of the tap coefficient register 9.

The tap coefficient is estimated, based upon an assumption that only the echo signal y(t) is inputted to the microphone 5. When a sound s(t) (transmitting signal) other than the echo signal y(t) is inputted, that has, in case of y(t)+s(t), the tap coefficient is not estimated correctly, because the tap coefficient as discussed above, is based on only the inputted echo signal (xt). When there is the additional transmitting signal s(t), it is, therefore, necessary to prohibit the tap coefficient from being updated.

For example, the signal levels of the input signal s(t)+y(t) inputted to the microphone 5 and an input signal to the loudspeaker 2, namely, the received signal x(t), are compared. When the power of s(t)+y(t) is larger than the power of y(t) by a predetermined amount, it is judged that there is a transmitting signal s(t) in addition to y(t), and the output data of the correction amount calculator 12 is brought to 0, to suspend temporarily an operation for updating the tap coeffiecient.

Thus, even when there is the transmitting signal s(t), the echo canceller can be stably operated.

The prior art as set forth above, however, involves some problems, which will be discussed hereinafter.

It is difficult to correctly detect the interval for prohibiting the updating operation, due to the properties of a sound. Occasionally, the amount of attenuation by the echo canceller is reduced due to possible delay of the detection or an erroneous detection of the interval. When a user speaks while he is listening to a radio or the like, all sounds other (e.g. sounds from the radio) than the sound (received signal) from the loudspeaker of the echo canceller are disturbances to the echo canceller. This causes an unstable operation.

Since the sound except the sounds from the loudspeaker of the echo canceller can be completely incorporated into the other part of the speech signal, this brings trouble into the speech signal. Especially, it has been a great problem that the sounds inconveniently heared by the other party cannot be reproduced in such a manner that they cannot be eliminated and are heard by the other party of the speech.

SUMMARY OF THE INVENTION

It is an object of the present invention, therefore, to provide an echo canceller and a communication apparatus employing the echo canceller which is capable of stably reproducing sounds other than a received sound during a speech so as not to be heard by the other party to the speech.

In order to attain the aforesaid object, the present invention includes an echo canceller with a first and a second input terminal and a first and a second output terminal, which cancels the signal component inputted to the second input terminal through an echo path from a signal inputted to said second input terminal, said echo path between the first output terminal and the second input signal terminal being adaptively estimated, comprising a signal mixing means for mixing a plurality of input signals connected to said first input terminal.

According to another aspect of the present invention, there is provided an echo canceller applied to a circuit system in which an echo path is formed between an output terminal and an input terminal for cancelling a signal component inputted via said echo path from an input signal of the input terminal, comprising a signal mixing means for mixing a plurality of input signals for outputting the resultant mixed through said output terminal.

The aforementioned echo canceller of the present invention includes a first output terminal connected with the first input terminal so as to have a through state by electrically connecting the first input terminal with the first output terminal.

The present invention further provides a communication apparatus having the aforesaid echo canceller of the invention and a bidirectional communication device, wherein the receiving signal of the bidirectional communication device is inputted to the one input terminal of the signal mixing means.

This communication apparatus preferably has the echo canceller of the present invention and the bidirectional communication device, together with a signal output device for outputting a signal different from a speech signal and acoustically outputted. The received signal of the bidirectional communication device and the output signal of said the output device are inputted, respectively, to the input terminal of the signal mixing means.

The present invention is applied to a communication apparatus, preferably to a telephone system. It especially exhibits a significant effect when used with a hands-free telephone set. When talking without using hands, the signal other than the received sound is inputted to the received signal input terminal of the echo canceller together with the received signal and simultaneously reproduced from the loudspeaker. This can solve the aforementioned problem.

The echo canceller of the present invention includes an acoustic echo canceller and a line echo canceller.

The operation of the present invention will now be explained by way of an example in which the echo path is an acoustic path.

According to the present invention, the received signal is mixed with other sound signals by the signal mixing means and inputted to the received signal input terminal (the first input terminal) of the echo canceller. The mixed signal is directly fed to the loudspeaker via an amplifier from the output terminal of the loudspeaker and reproduced as a sound.

The mixed signal inputted to the microphone via the echo path and reconverted to an electric signal is properly amplified by the amplifier and inputted to the input terminal of the microphone of the echo canceller.

The echo canceller cancels the mixed signal inputted to the microphone via the loudspeaker according to the aforementioned function. Consequently, said mixed signal is not outputted from a transmitting output terminal. The mixed signal, therefore, cannot be heard by the other party of the speech.

Such a function is most preferable when talking is made into a telephone while listening to music, etc. In this case, a signal such as a voice or a sound is mixed with the received signal and reproduced from the the loudspeaker through the echo canceller.

At this time, audio equipment of high performance may preferably be employed for the loudspeaker, amplifier, etc.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiment but are for explanation and understanding only.

In the drawings.

DESCRIPTION OF THE PREFERRED EMBODIMENTS

Figure 1:
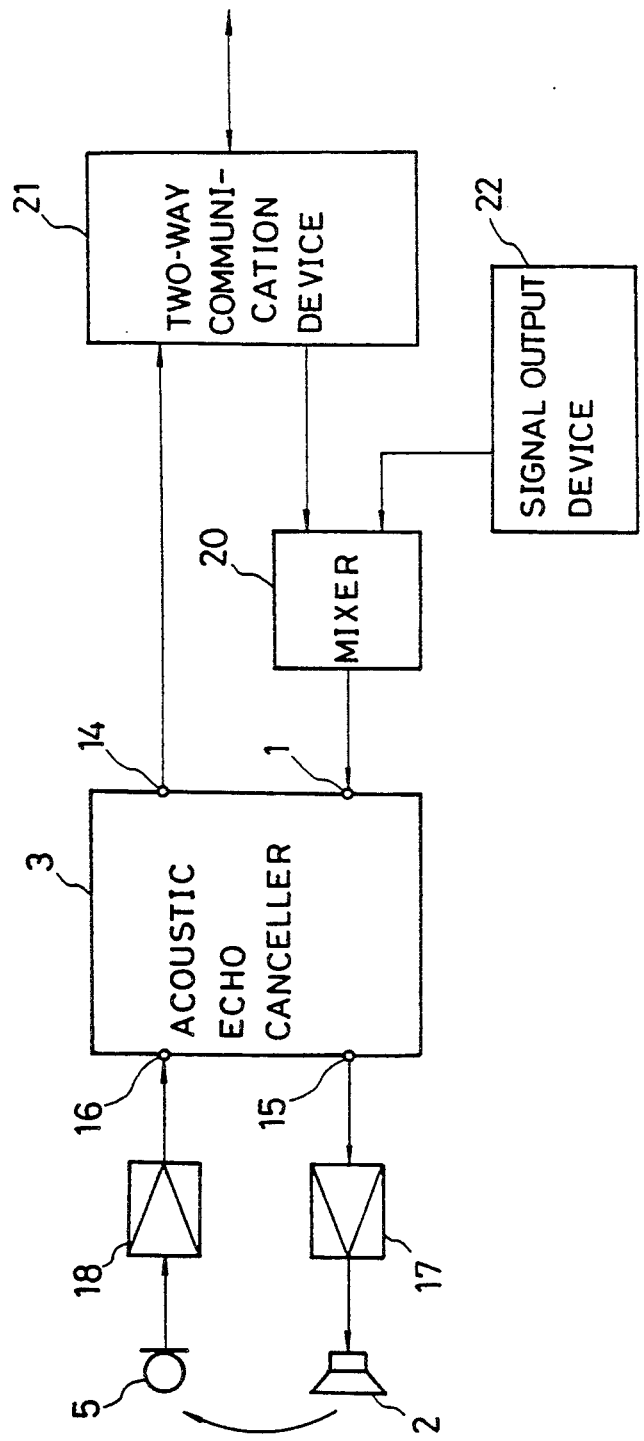
FIG. 1 is a block diagram showing a first embodiment of the present invention.

Referring now to the drawings, preferred embodiments of the present invention will be explained in more detail. The same or similar reference numerals are used to indicate the same or similar parts throughout the embodiments, and redundant explanation referring to the same or similar parts are omitted.

FIG. 1 shows a constitution of the first embodiment of the present invention. In FIG. 1, a reference numeral 3 designates an acoustic echo canceller unit and reference numeral 20 designates a mixer for mixing two signals inputted thereto and outputting the so mixed signal. Reference numeral 22 indicates a signal output device for a sound of a radio or the like.

Figure 2:
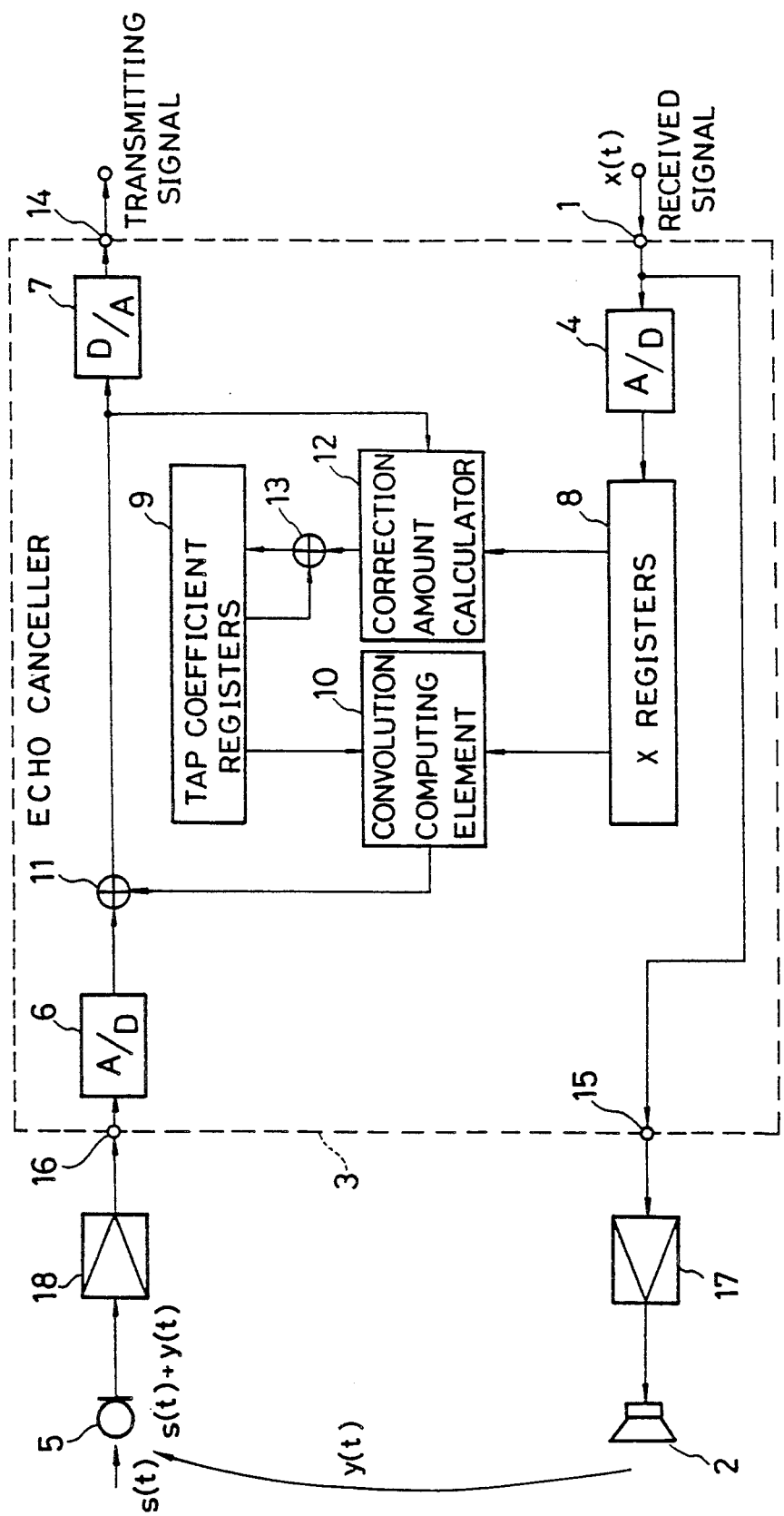
FIG. 2 is a block diagram showing a conventional form of an echo canceller.

An acoustic canceller unit has substantially the same constitution as that set forth above and shown in FIG. 2 and operates in a similar manner. The explanation, therefore, is not repeated here.

A sound signal of the other party of the speech fed from a bidirectional or two-way communication device 21 such as a telephone set, that is, a received signal or a listener's signal is inputted to the mixer 20. The output signal from the signal output device 22 is also inputted to this mixer 20. The mixer forms a mixed signal from these two input signals. The mixed signal is fed to a received input terminal 1 of the acoustic echo canceller unit 3. A loudspeaker output terminal 15 of the acoustic echo canceller unit is connected to the input terminal of an amplifier 17. Accordingly, the aforesaid mixed signal is reproduced as a sound from the loudspeaker 2 after passing through the amplifier 17 via the acoustic echo canceller unit 3.

A microphone 5 is connected to an input terminal of an amplifier 18 and the output terminal of the amplifier 18 is connected to a microphone input terminal 16 of the acoustic echo canceller unit 3. Further, a transmitting output terminal 14 is connected to the bidirectional communication device 21. A transmitting signal is fed to the bidirectional communication device 21 and transmitted to the other party of the speech.

The acoustic echo canceller unit 3 estimates characteristics of an echo path from the loudspeaker 2 to the microphone 5, cancels the mixed signal passing through the echo path and feeds it to the bidirectional communication device 21 as the transmitting signal. Thus, the mixed signal formed of the received signal and the signal from the signal output device 22 is not transmitted to the other party of the speech as the transmitting signal.

According to this embodiment, a sound from a radio or the like can be reproduced from the loudspeaker so as not to be heard by the other party while speaking by using a hands-free telephone set.

Since the signal outputted from the loudspeaker output terminal 15 of the acoustic echo canceller unit is the received signal itself entering the received signal input terminal 1, the input terminal of the amplifier 17 may be connected to the output signal line of the mixer 20.

Figure 3:
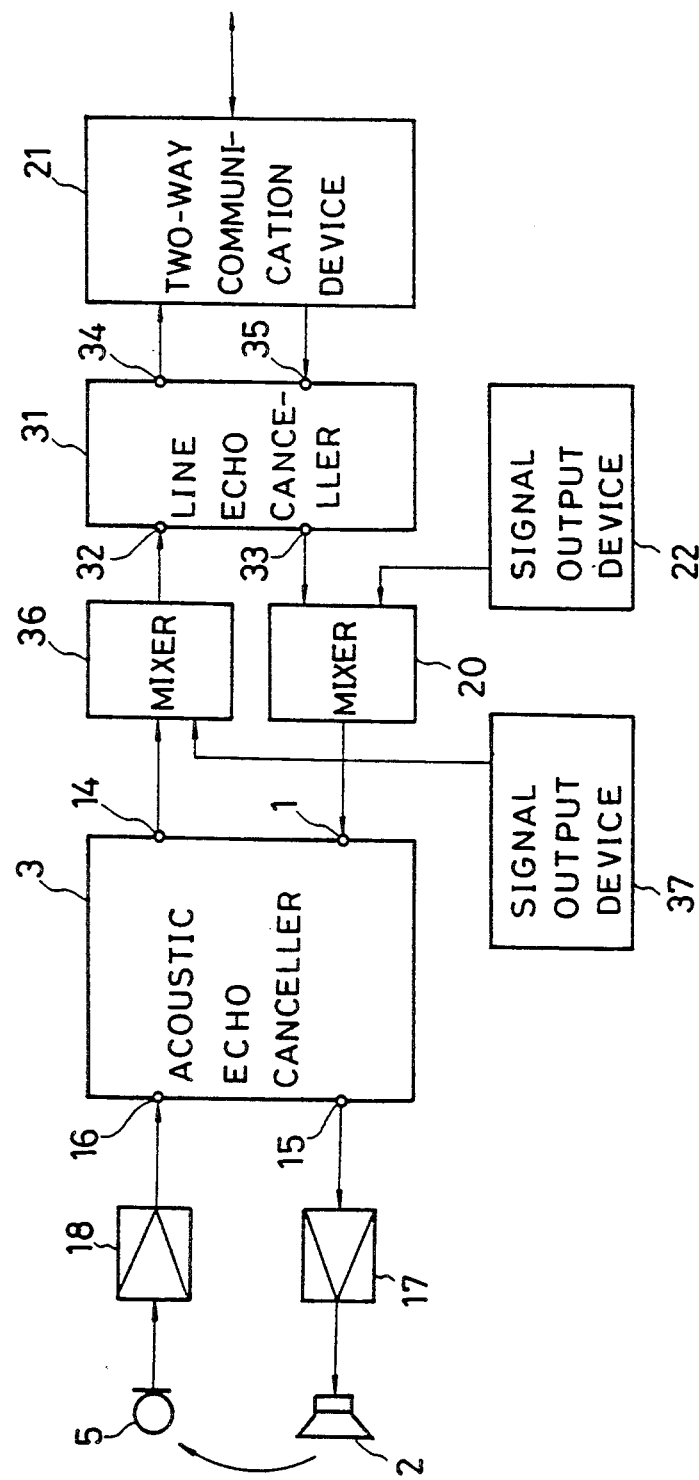
FIG. 3 is a block diagram showing a second embodiment of the present invention.

A second embodiment is illustrated in FIG. 3. In this embodiment, not only the acoustic echo canceller unit 3 but also a line echo canceller unit 31 is provided in a direction for erasing a reflecting signal from a line as illustrated in FIG. 3.

In FIG. 3, a mixer 36 mixes the transmitting signal for the acoustic canceller unit 3 with an output signal of a signal output device 37 and inputs the resultant mixed signal to an input terminal 32 of the line echo canceller unit 31.

The line echo canceller unit 31 transmits a transmitting signal to the bidirectional communication device 21 through an output terminal 34 and receives a received signal at an input terminal 35. Further, a received signal is inputted to a mixer 20 from the output terminal 33 of the line echo canceller unit 31 and an output signal from a signal output device 22. The output from the mixer 20 is inputted to the receiving signal input terminal 1 of the acoustic echo canceller unit 3.

The mixed signal inputted to the input terminal 32 of the line echo canceller unit 31 is directly outputted from the output terminal 34 and inputted to the input terminal of the bidirectional communication device 21. This mixed signal is reflected by a two-wire/four-wire converter (not shown) or the like in the bidirectional communication device 21, and mingled with the received signal and inputted again to the input terminal 35 with the received signal.

The line echo canceller unit 31 adaptively estimates this reflection path and erases the transmitting signal from the signals inputted to the input terminal 35 to output the treated signal from the output terminal 33 as a received signal applied to the mixer 20.

Accordingly, the transmitting signal is not mixed in the signal inputted to the mixer 20.

Thus, the output signal from the signal output device 37 is transmitted as a transmitting signal so as to be heard only by the other party of the speech, and it is not heard by the user.

Figure 4:
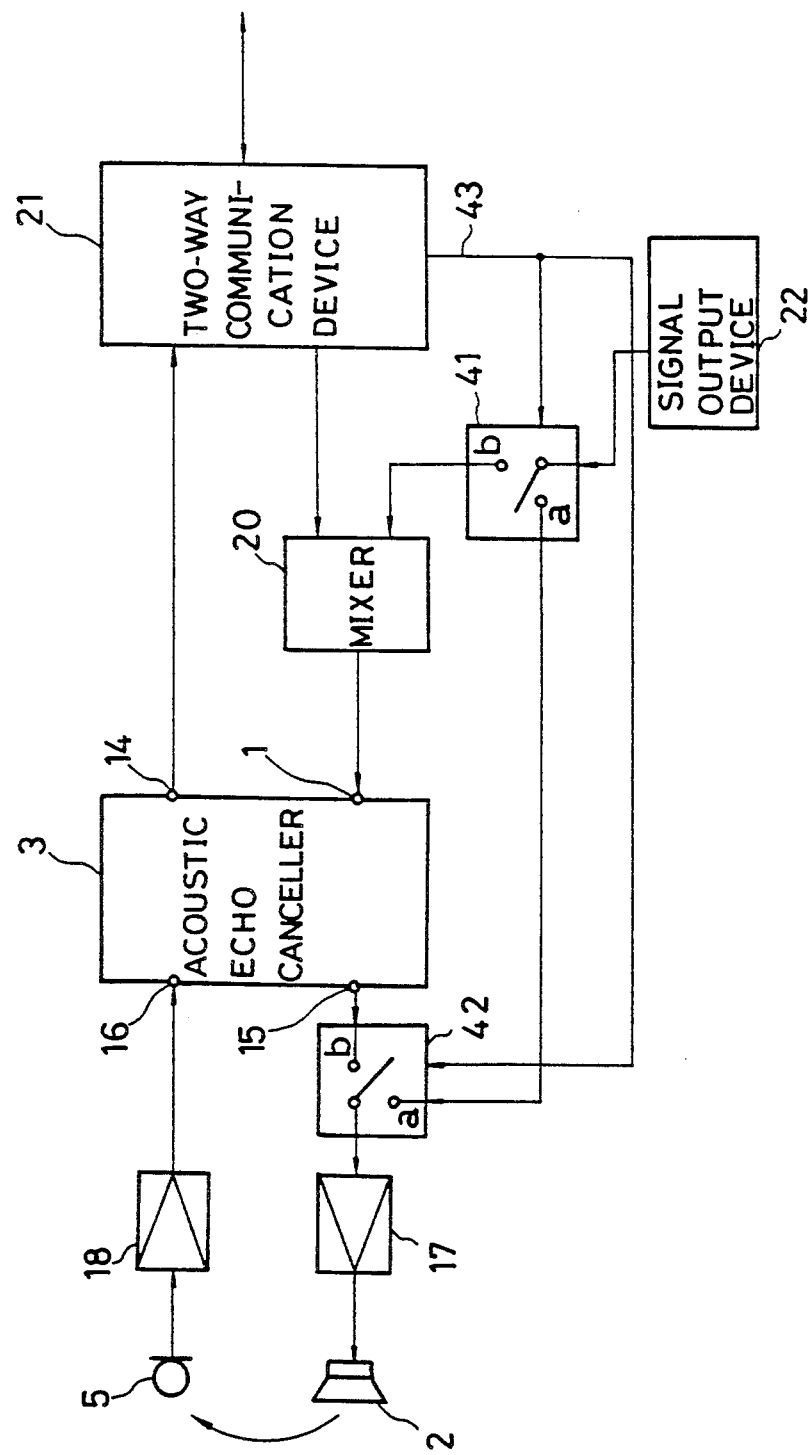
FIG. 4 is a block diagram showing a third embodiment of the present invention.

In the third embodiment of the invention, as illustrated in FIG. 4, changeover switches 41 and 42 are provided so as to automatically apply the output of the signal output device 22 to the mixer 20 when the bidirectional communication device 21 is operating, while it is normally connected to the input terminal of the amplifier 17 and reproduced from the loudspeaker.

A control signal line 43 of the bidirectional communication device 21 is connected to the control terminals of the changeover switches 41 and 42. The changeover switches 41, 42 are normally connected to the side of a. During the speech, they are respectively changed over to the side of b by control signals passing through the control signal line 43, according to an instruction from the bidirectional communication device 21.

The output signal of the signal output device 22, therefore, is normally sent to the amplifier 17 directly by the changeover switches 41 and 42 and reproduced from the loudspeaker 2. On the other hand, during the speech, the output signal of the signal output device 22 is sent to the mixer 20, and mixed with a received signal. The signal then enters an acoustic echo canceller unit 3 through the receiving input terminal 1 and the resultant mixed signal is reproduced from the loudspeaker 2 after passing through amplifier 17 from the loudspeaker output terminal 15.

According to this embodiment, when the bidirectional communication device 21 such as a telephone is not used, the echo canceller unit 3 is not required to operate. Therefore, the output signal of the signal output device 22 can be effectively reproduced with a lower consuming power.

Figure 5:
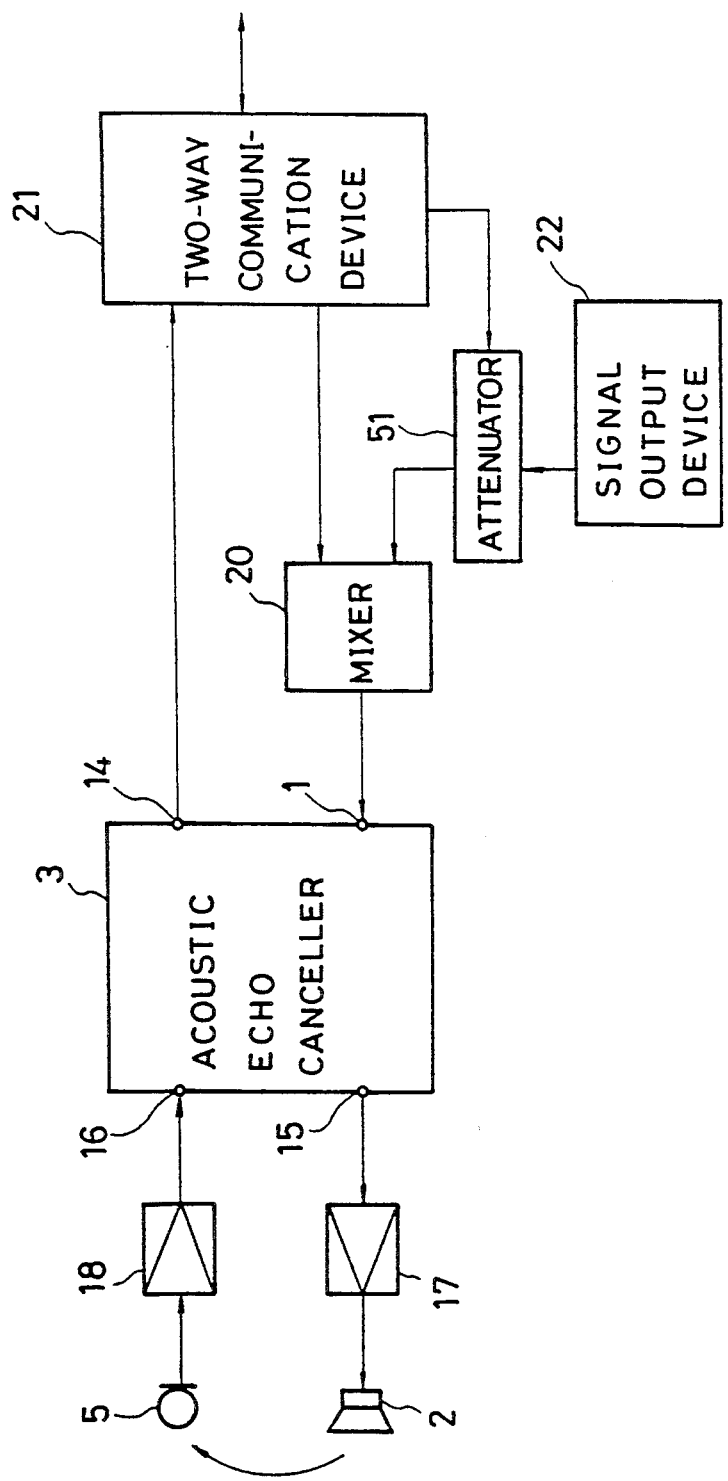
FIG. 5 is a block diagram showing a forth embodiment of the present invention.

A fourth embodiment is an example provided with a level changing means and constituted in such a way that an output of the signal output device 22 is inputted to the mixer 20 via an attenuator 51 as illustrated in FIG. 5.

The attenuator 51 does not normally execute an attenuating operation. When the bidirectional communication device 21 operates, however, the signal of the signal output device 22 is attenuated by a given amount according to an instruction from the bidirectional communication device 21 and fed to the mixer 20.

Thus, if a received signal is outputted from the bidirectional communication device 21 when a user listens to a sound from the signal output device 22, he effectively easily hears the received sound because a signal reproducing level from the signal output device 22 is attenuated by the given amount.

Alternatively, instead of attenuating the output signal of the signal output device 22, the received sound which is the output signal from the bidirectional communication device 21 may be amplified by an amplifier, inputted to the mixer 20, so that the mixed signal may be attenuated.

This provides a similar effect to that obtained when the attenuator 51 is provided.

Figure 6:
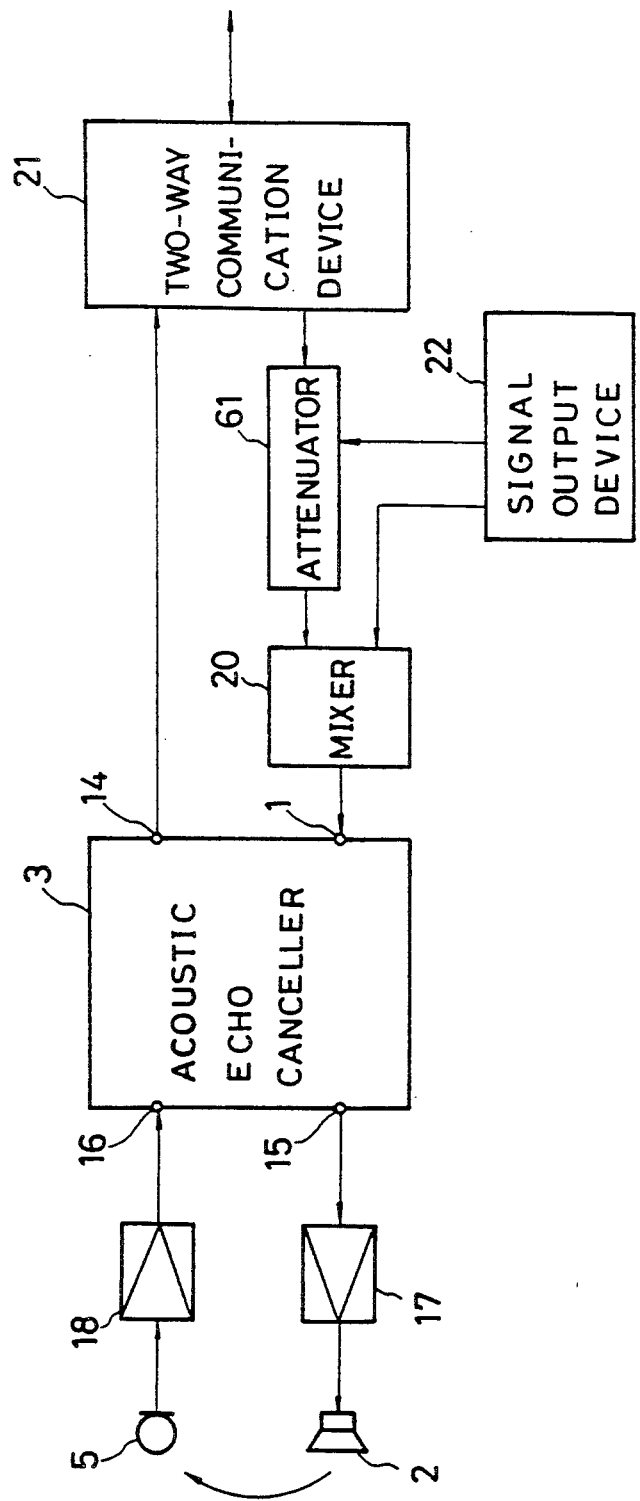
FIG. 6 is a block diagram showing a fifth embodiment of the present invention.

In a fifth embodiment shown in FIG. 6, an output of the bidirectional communication device 21 is inputted to the mixer 20 through an attenuator 61 which is a level changing means.

The attenuator 61 does not normally perform an attenuating operation, but it attenuates a received sound from the bidirectional communication device 21 to a given level and feeds the attenuated sound signal to the mixer 20 according to an instruction received from the signal output device 22. As a result of this, the received sound is attenuated by a constant level, so that a user can easily hear the signal from the signal output device 22.

Instead of attenuating the received sound of the bidirectional communication device 21, the output signal of the signal output device 22 may alternatively be amplified by an amplifier, and inputted to the mixer 20 and the resultant mixed signal may be attenuated. In this case, a similar effect is obtained/achieved to that obtained when the attenuator 61 is provided.

Figure 7:
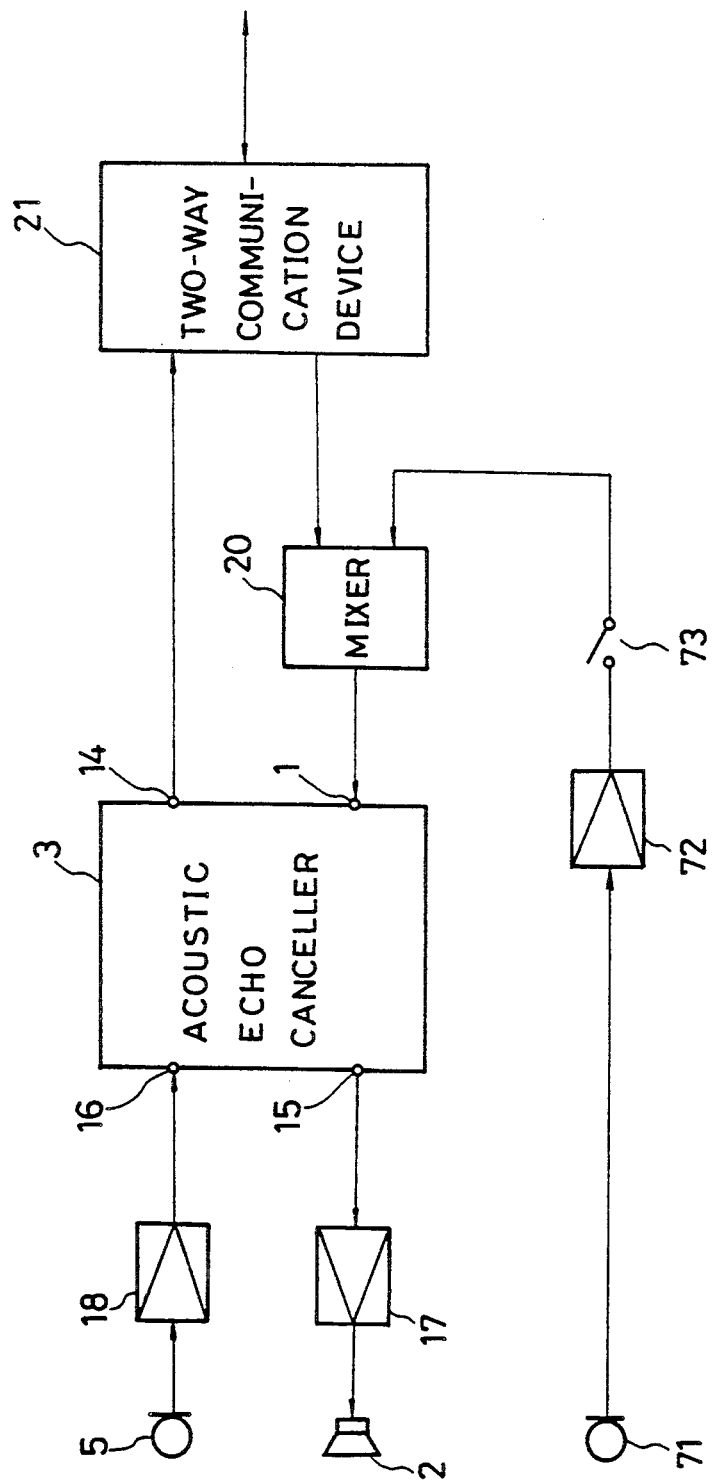
FIG. 7 is a block diagram showing a sixth embodiment of the present invention.

A sixth embodiment shown in FIG. 7 provides another microphone 71 different from the microphone 5. The output from the microphone 71 is inputted to the mixer 20 via an amplifier 72 and a switch 73. The switch 73 is turned on or off by a user as required. A sound signal collected by the microphone 71 is reproduced from the loudspeaker 2 via the acoustic echo canceller unit 3 and reaches the ear of the user. The sound sent to the microphone 5, however, is cancelled by the acoustic echo canceller unit 3 and is not fed to the bidirectional communication device 21 as a transmitting signal. According to this embodiment, a specific sound can be heard selectively or referentially during the talking through the hands-free telephone set, and the sound is not heard by the other party of the conversation. This is especially preferable when it is necessary to hear sounds outside a car, while talking within the car having an excellent sound insulation. If a window is opened to hear the sounds outside the car, sounds which cannot be erased by the echo canceller enters the microphone 5, and this is inconveniently transmitted to the other party of the speech, or the route of the echo path in the car is abruptly changed to reduce the amount of the attenuation of the echo canceller greatly, causing an unstable operation or possibly causing interruption in the speech.

According to this embodiment, the sound outside the car is reproduced from the loudspeaker 2 via the echo canceller unit 3, and the sound sent to the microphone 5 is erased by the echo canceller unit.

The examples of the signal output device incorporated in the foregoing embodiments include acoustic equipments such as a radio, a stereophonic equipment, sound output devices of such equipments for an image such as a television, a sound synthesizer or various types of alarm sound systems such as an overspeed alarm generator sound. Alternatively, a signal generator such as a sound synthesizer or an alarm sound generator may be provided in the bidirectional communication device such as a telephone independently from the same.

In the embodiments mentioned above, the echo canceller is operated digitally or though digital signal processing.

Description is now given of the bidirectional communication device which is an example of the communication device preferably applicable to the echo canceller system of the present invention.

A device of a line side to which or from which a received signal or a transmitting signal are inputted or outputted is called a bidirectional or two-way communication device. This bidirectional communication device includes a telephone set held in a house, and any device for simultaneously transmitting a sound signal in two directions irrespective of a wire or a wireless system. As a specific example of the bidirectional communication device, a mobile telephone system will now be explained.

Figure 8:
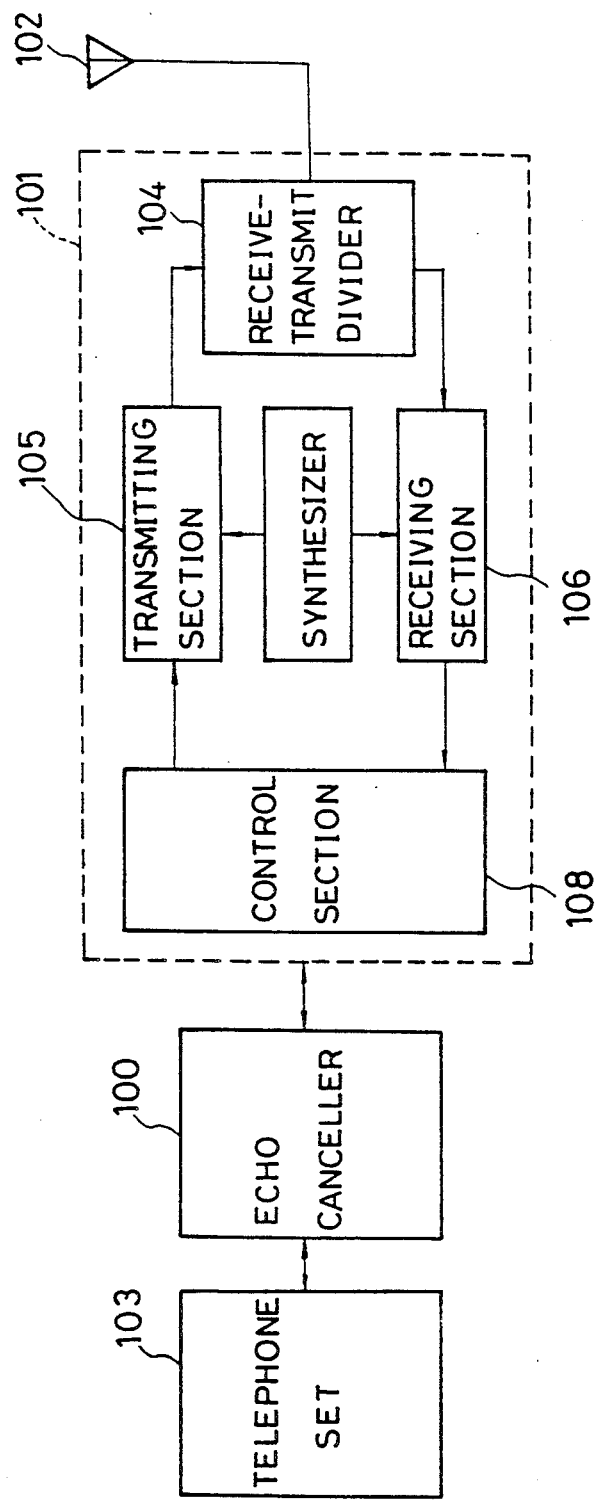
FIG. 8 is a block diagram showing one form of a bidirectional communication device applied to a mobile telephone system.

One specific form of the bidirectional communication device applied to the mobile telephone system is illustrated in FIG. 8.

In FIG. 8, a reference numeral 101 indicates a mobile machine to which an antenna 102 and a telephone set 103 are connected. The antenna 102 is connected to a transmitting section 105 and a receiving section 106 through a transmit receive divider 104 in the mobile machine 101. The transmitting section 105 and the receiving section 106 respectively use an output signal of a synthesizer section 107 to modulate and demodulate it. The telephone set 103 is connected to the transmitting section 105 and the receiving section 106 through a control section 108.

A transmitting signal is fed from the telephone set 103 and modulated in the transmitting section 105 via the control section 108. The modulated transmitting signal is transmitted from the antenna 102 via the transmit-receive divider 104. A modulated received signal is received by the antenna 102 and enters the receiving section 106 through the divider 104. It is then demodulated to a received signal and fed to the telephone set 103 through the control section 108. The transmitting signal and the received signal are electric signals of a so-called telephoe band (300 to 3400 Hz).

The telephone set 103 is provided with a loudspeaker for converting the received signal to a sound signal and a microphone for converting the sound signal to the transmitting signal which are built in a handset. In addition, it has a function of a dial device or the like, which is not shown in FIG. 8. The mobile machine 101 may alternatevely be integrated with the telephone set 103 as different from the formation of FIG. 8 in which the mobile machine 101 is provided separately from the telephone set 103. Preferably, a hands-free telephone set may be used.

Between the mobile machine 101 and the telephone set 103 is inserted and connected an echo canceller unit 100. This echo canceller unit 100 may be any echo canceller unit as employed in the foregoing embodiment. The echo canceller unit 100 may include one or both of the acoustic echo canceller unit and the line echo canceller unit.

A typical example of the echo canceller unit 100, is the acoustic echo canceller unit 3 to which the mixer 20 is connected as shown in FIG. 1. In this case, the signal output device 22 may be a radio, a cassette tape reproducing device, a compact disc player or the like. Information such as music, etc., supplied from the signal output device is outputted as a sound through the loudspeaker 2 shown is FIG. 1.

The present invention is further preferably applied to a conference system using a telephone.

According to the present invention, even when a sound other than the received sound is reproduced during the speech through the hands-free telephone, an unstable operation is not generated. As can be seen from the foregoing discussion, the present invention provides such an effect that the sound except the sound from the loudspeaker is not heard by the other party of the conversation since it is cancelled by the echo canceller, which allowing the sound, which is not desired to be heard, to be reproduced.

While the present invention has been disclosed in terms of the preferred embodiments in order to facilitate better understanding of the invention, it should be appreciated that the invention can be embodied in various ways without departing from the principle of the invention. Therefore, the invention should be understood to include all posible embodiments and modifications to the shown embodiments which can be embodied without departing from the principles of the invention set out in the appended claims.

What is claimed is:

1. An echo canceller comprising: a first input terminal and a second input terminal; a first output terminal and a second output terminal; means including an echo path for cancelling a signal component from a signal received by the second input terminal on the basis of an adaptive estimation of said signal component, said echo path being disposed between the first output terminal and the second input terminal; and signal mixing means connected to said first input terminal for mixing a plurality of input signals and applying the mixed input signals to said first input terminal.

2. An echo canceller according to claim 1, wherein said first output terminal is electrically connected to the first input terminal so as to form a through state.

3. A circuit system comprising: an echo canceller including an input terminal, an output terminal, and an echo path disposed between the output terminal and the input terminal, said echo canceller further including means for cancelling a signal component received via said echo path from an input terminal signal of the input terminal and signal mixing means connected to said output terminal for mixing a plurality of input signals and for generating and transmitting a resultant mixed input signal to said output terminal.

4. A communication apparatus comprising: an echo canceller, signal mixing means connected to said echo canceller for mixing an output signal and a received signal and a bidirectional communication device for generating said received signal, wherein said received signal of said bidirectional communication device is applied to an input terminal of said signal mixing means and wherein said echo canceller further includes a first input terminal and a second input terminal, a first output terminal and a second output terminal, an echo path and means for cancelling a signal component from a first signal received by the second input terminal on the basis of an adaptive estimation of said signal component, said echo path being disposed between the first output terminal and the second input terminal.

5. A communication apparatus comprising: an echo canceller; signal mixing means connected to said echo canceller for mixing a first signal and a received signal; a bidirectional communication device for generating said received signal; and a signal output device for generating and transmitting the first signal on the basis of an acoustic signal received by said signal output device, said signal mixing means receiving said received signal of said bidirectional communication device and the first signal of said signal output device wherein said echo canceller includes a first input terminal and a second input terminal, a first output terminal and a second output terminal and an echo path, said echo canceller cancelling a signal component of a second signal received by the second input terminal on the basis of an adaptive estimation of said signal component, said echo path being disposed between the first output terminal and the second input terminal.

6. An echo canceller according to claim 1, said echo canceller further comprises at least one level changing means to generate a level changed signal in response to the plurality of input signals and for applying said level changed signal to an input of said signal mixing means.

7. A communication apparatus according to claim 5, wherein said communication apparatus further comprises at least one level changing means for generating a level changed signal in response to the first signal and for applying said level changed signal to an input of said signal mixing means.

8. A communication apparatus according to claim 4, wherein the communication apparatus further comprises at least one level changing means for generating a level changed signal and for applying said level changed signals to the input of said signal mixing means, said level changed signal being responsive to the received signal of said bidirectional communication device.

9. A communication apparatus according to claim 4, wherein said communication apparatus further comprises at least one level changing means for generating a level changed signal and for applying said level changed signal to the input of said signal mixing means, said level change means being responsive to said output signal.

10. A communication apparatus according to claim 7 or 9, wherein said at least one level changing means is controlled by a control output of said bidirectional communication device.

11. A communication apparatus according to claim 8, wherein said at least one level changing means is controlled by a control output of said signal output device.

12. A communication device according to claim 4, wherein said echo path is an acoustic path between a loudspeaker and a microphone and an acoustic echo canceller is said echo canceller.

13. A communication apparatus according to claim 4, wherein said bidirectional communication device includes a two-wire/four-wire converter to generate a reflected signal in said bidirectional communication device and said communication apparatus further includes a line echo canceller to cancel said reflected signal.

14. A communication apparatus according to claim 4, wherein said echo path is an acoustic path between a loudspeaker connected to the first output terminal and a microphone connected to the second input terminal, and said bidirectional communication device includes a two-wire/four-wire converter to generated a reflected signal, and said communication apparatus includes a line echo canceller to cancel said reflected signal from said communication apparatus.

15. A communication apparatus according to claim 5, said communication apparatus further comprises a selecting means for selecting either said signal mixing means to receive said first signal from said signal output device or said signal output device to transmit the first signal to the echo path, the selecting means being controlled by a control output from said bidirectional communication device.

16. An echo canceller according to claim 1, said echo canceller further comprising a sound collecting means to generate an output signal thereof, said output signal being inputted to one input terminal of said signal mixing means.

17. A communication apparatus according to claim 4, wherein said communication apparatus further includes a mobile telephone and a mobile station is the bidirectional communication device.

18. A communication apparatus according to claim 4, wherein said communication apparatus further includes a teleconference system.

19. A communication apparatus as in claim 7, wherein the at least one level changing means is an attenuator.

20. A communication apparatus as in claim 7, wherein the at least one level changing means is an amplifier.

* * * * *